United States Patent
Matsumoto

(10) Patent No.: US 7,329,036 B2
(45) Date of Patent: Feb. 12, 2008

(54) PRESSURIZING LID STRUCTURE OF A KNEADER

(75) Inventor: Shinichi Matsumoto, Sanda (JP)

(73) Assignee: Moriyama Co., Ltd., Hyogo (JP)

( * ) Notice: Subject to any disclaimer, the term of this patent is extended or adjusted under 35 U.S.C. 154(b) by 0 days.

(21) Appl. No.: 11/543,809

(22) Filed: Oct. 6, 2006

(65) Prior Publication Data

US 2007/0127307 A1 Jun. 7, 2007

(30) Foreign Application Priority Data

Dec. 2, 2005 (JP) .............................. 2005-349376

(51) Int. Cl.
*B29B 7/24* (2006.01)
(52) U.S. Cl. ...................................... 366/76.7
(58) Field of Classification Search ............... 366/76.7, 366/76.8, 76.1, 76.9, 76.93, 154.1; 425/583
See application file for complete search history.

(56) References Cited

U.S. PATENT DOCUMENTS

| | | | | |
|---|---|---|---|---|
| 1,905,755 A | * | 4/1933 | Schnuck et al. | 366/76.7 |
| 3,572,645 A | * | 3/1971 | Matsuoka | 366/76.7 |
| 5,061,078 A | * | 10/1991 | Yada | 366/76.2 |
| 5,516,206 A | * | 5/1996 | Seide et al. | 366/76.7 |
| 6,422,733 B1 | * | 7/2002 | Adams et al. | 366/76.7 |
| 2007/0127307 A1 | * | 6/2007 | Matsumoto | 366/76.7 |
| 2007/0177450 A1 | * | 8/2007 | Borzenski et al. | 366/76.7 |

FOREIGN PATENT DOCUMENTS

| | | | |
|---|---|---|---|
| DE | 3426442 C1 | * | 12/1985 |
| EP | 995564 A1 | * | 4/2000 |
| GB | 2231503 A | * | 11/1990 |
| JP | 61-167433 | * | 7/1986 |
| JP | 4-62005 | * | 2/1992 |
| JP | 7-124941 | * | 5/1995 |
| JP | 10119035 A | * | 5/1998 |
| JP | 10-244143 | * | 9/1998 |
| JP | 2006-95912 | * | 4/2006 |

* cited by examiner

*Primary Examiner*—Charles E. Cooley
(74) *Attorney, Agent, or Firm*—Wenderoth, Lind & Ponack, L.L.P.

(57) ABSTRACT

In a kneader having a mixing tank 1 for storing the kneaded material, a pair of rotors, 2 disposed in parallel for kneading the kneaded material stored in the mixing tank 1, and a pressurizing lid 3 inserted slidably in the opening at the top of the mixing tank 1, the sliding portion of the pressurizing lid 3 against the mixing tank 1 is divided into a plurality of stages (upper, lower), packings P1, P2 are disposed for reducing the clearance between the respective pressurizing lids and the side wall of the mixing tank as much as possible, and an air reservoir 33 is formed between the upper and lower lids 31, 32.

6 Claims, 11 Drawing Sheets

F I G. 4 (a)
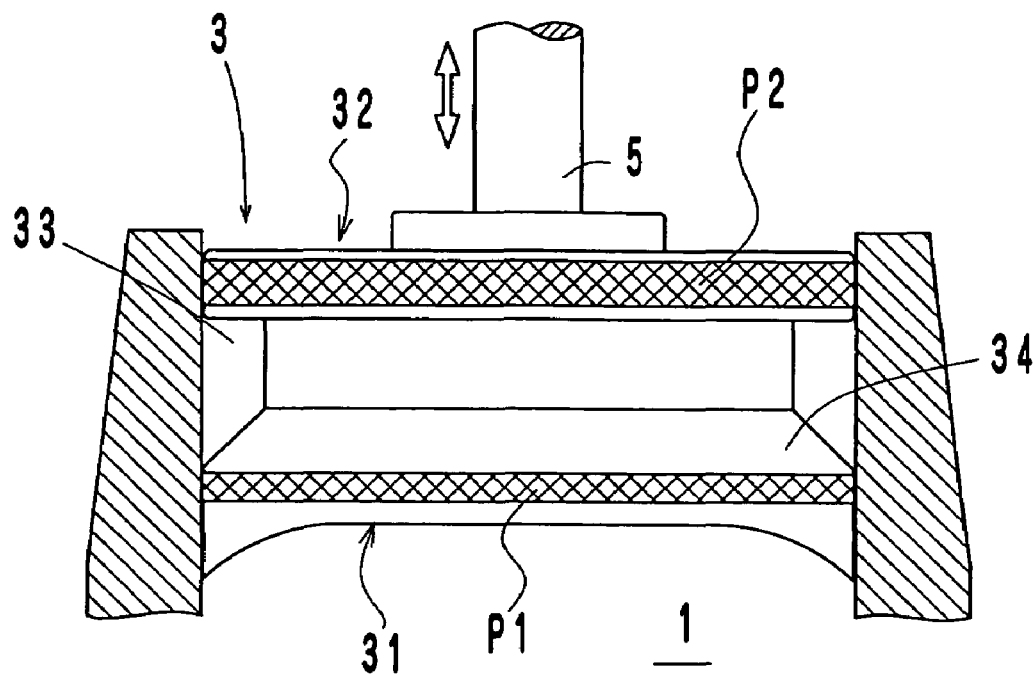
F I G. 4 (b)
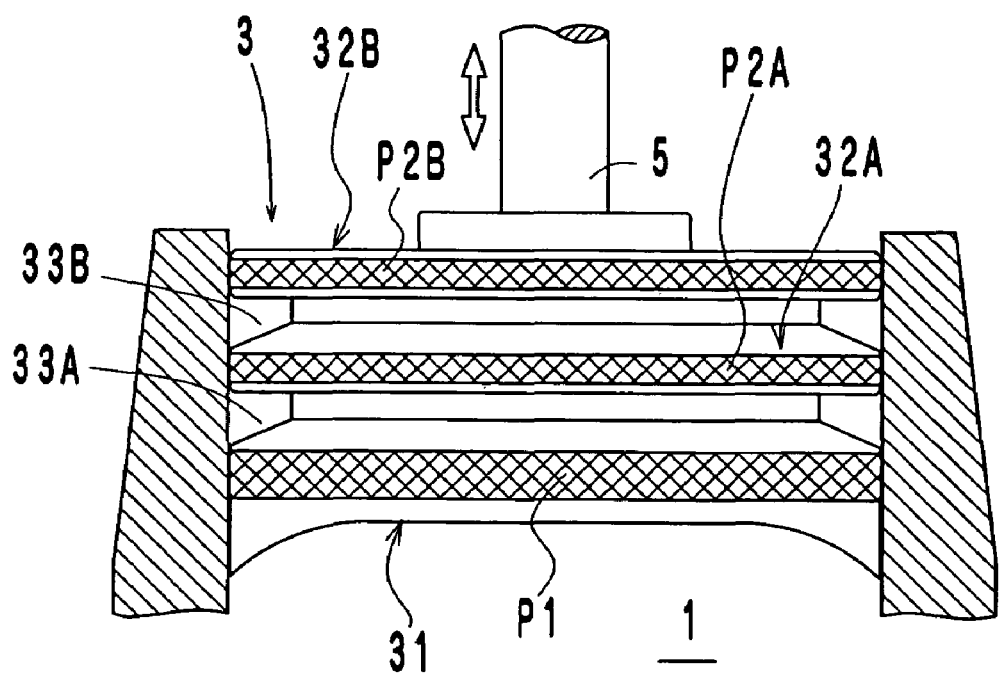

F I G. 5 (a)
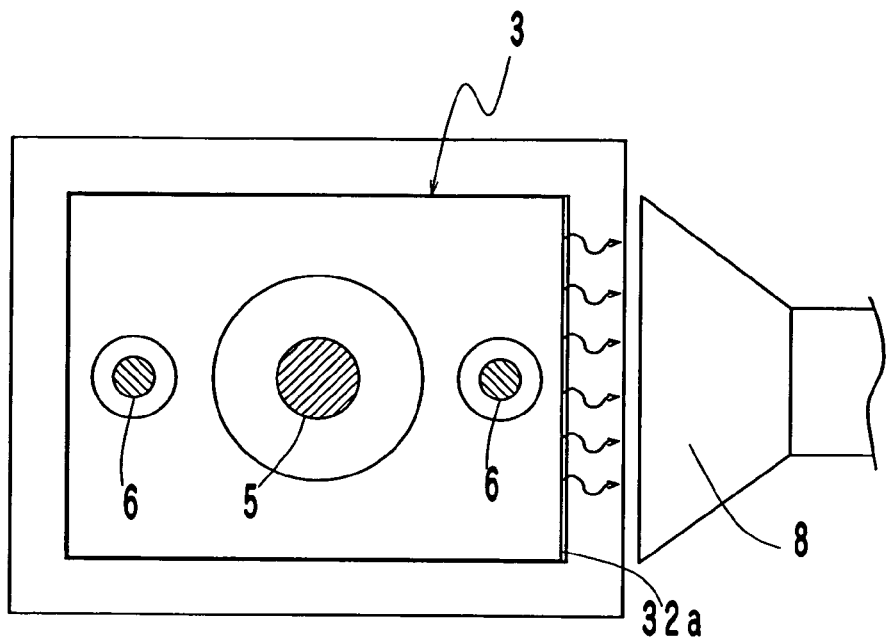
F I G. 5 (b)
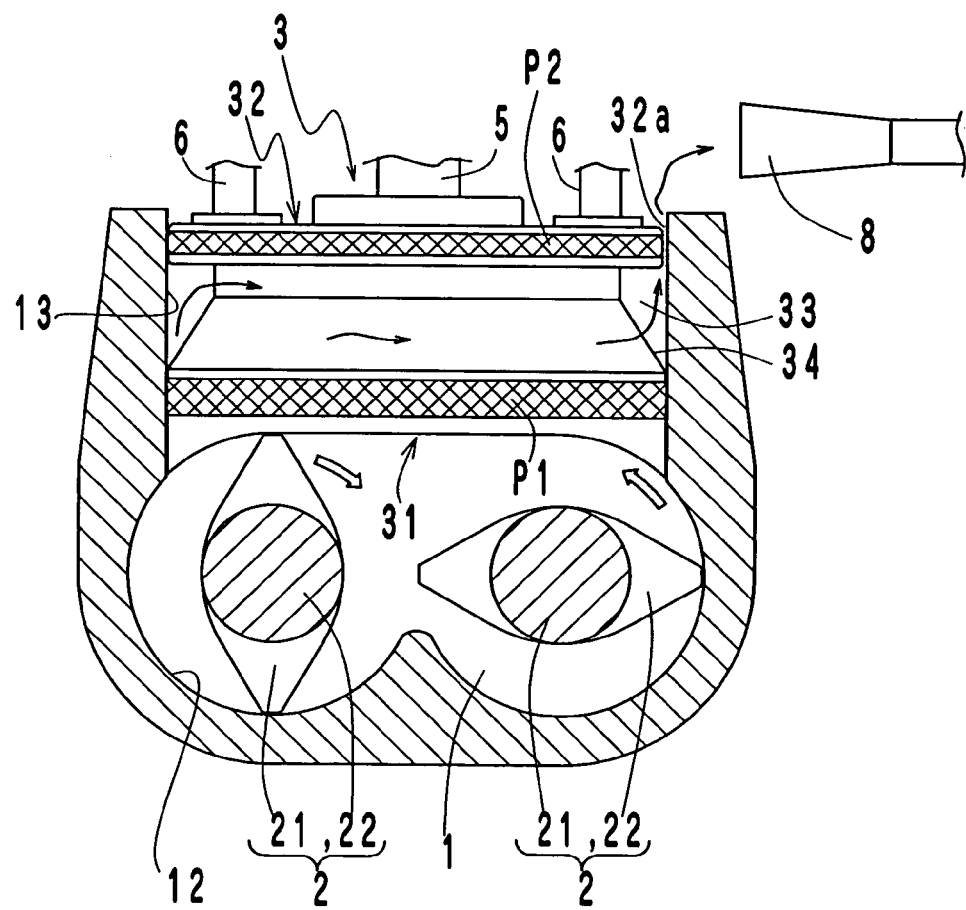

F I G. 9 (a)
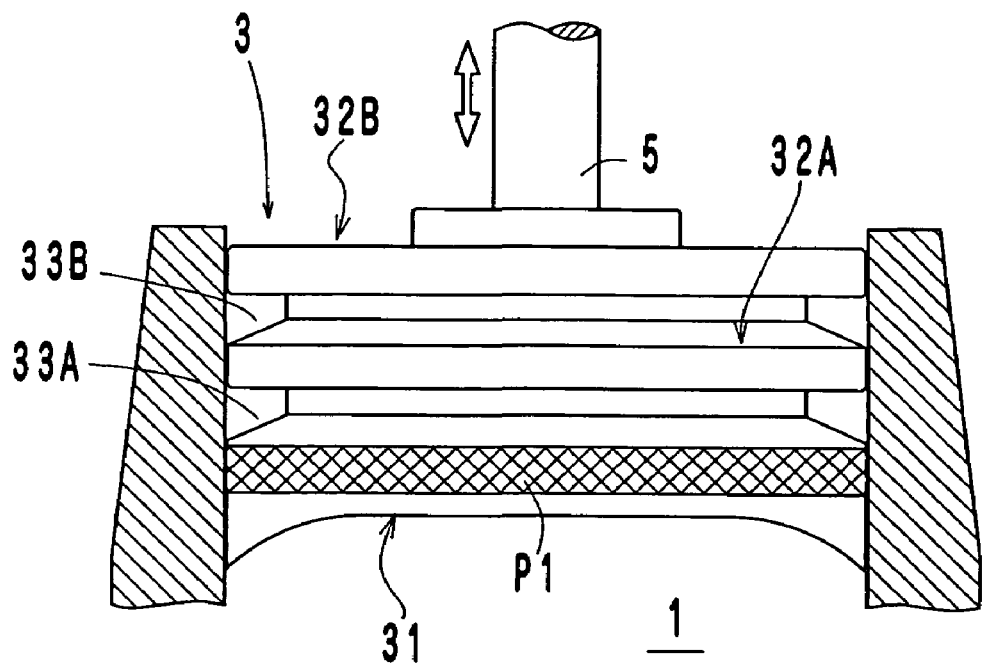
F I G. 9 (b)
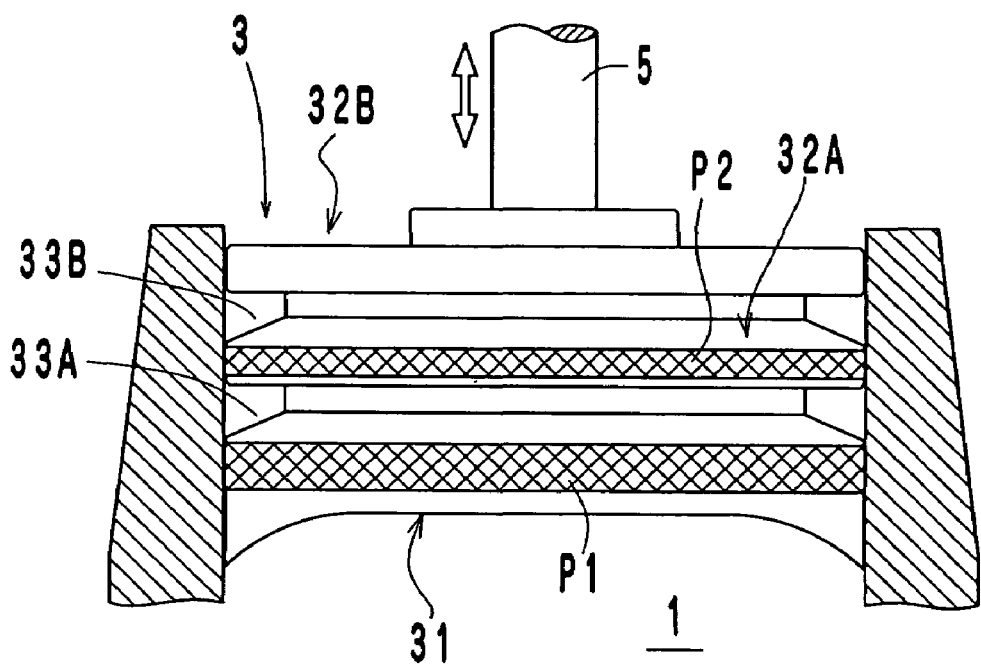

PRESSURIZING LID STRUCTURE OF A KNEADER

BACKGROUND OF THE INVENTION

The present invention concerns a kneader, and more specifically a kneader capable of eliminating a cleaning process in the kneading process, by preventing gushing of the filler through the clearance between the mixing tank and the pressurizing lid, stabilizing the blending ratio of the filler and preventing defective dispersion due to fall and mixing of the filler after the completion of kneading, for promoting improvement of dispersion and uniformity of kneaded materials such as rubber, plastics, etc. as well as stability of quality.

Conventionally, a kneader is constructed by disposing a pair of rotors, 2 in a mixing tank 1 as shown in FIG. 11, in a way to turn inward mutually, forming a rotor blade 22 (twisted blade) by twisting the rotor so that the kneaded material may constantly be forwarded to the inner side (center side) of the mixing tank 1, and further disposing a pressurizing lid 4 at the top of the mixing tank 1, to have the kneaded material such as rubber, plastics, etc. bitten by the pair of rotors, 2.

Moreover, to perform the biting of kneaded material between the rotors more effectively, the kneader is constructed by disposing a pressurizing means such as an air cylinder, etc. (not illustrated) on the pressurizing lid 4 to enable to move the pressurizing lid 4 up and down in a state in which a certain pressurizing force is applied to it, so that the inner section of the mixing tank 1 may have a shape and an inner volume suitable for the kneaded material.

By the way, when kneading the kneaded materials by using this type of kneader, there are cases where the volume and shape of the voids in the kneaded material change in a variety of ways with the rotation of the rotors, 2, and the reactional force of the material behavior due to this change causes dancing of the pressurizing lid 4, eventually making the filler contained in the kneaded materials gush out through the clearance between the mixing tank 1 and the pressurizing lid 4 together with air.

And, it was a normal practice to mount a dust cover at the point of the mixing tank 1 where the filler gushes out, to prevent the gushed filler from flying to the surrounding area and to also facilitate cleaning of the gushed filler and, when the area around the top part of the mixing tank 1 and the top face of the pressurizing lid 4 are stained with the gushed filler, clean up the filler by opening the dust cover.

However, if the filler gushes out to the top part of the pressurizing lid 4, it not only stains the surrounding area but also presents a problem of remarkably lowering the productivity, because it becomes necessary to set a cleaning process of the filler which accumulated at the top face 42 of the pressurizing lid 4 and at the peripheral part 1a of the opening at the top of the mixing tank 1 in the kneading process, and stop the equipment operation for it.

Moreover, another problem was that a change of blending ratio is produced in proportion to the spouted filler, causing unevenness of quality among batches, or the filler which accumulated at the top face 42 of the pressurizing lid and at the peripheral part 1a of opening at the top of the mixing tank drops and is mixed in the material at the time of discharge of the material after the completion of kneading, causing a defective dispersion, etc. (see Laid-Open Patent Publication No. H7-61438, for example).

SUMMARY OF THE INVENTION

The objective of the present invention, realized in view of the above-described problems of conventional kneaders, is to provide a kneader capable of eliminating a cleaning process in the kneading process by preventing gushing of the filler through the clearance between the mixing tank and the pressurizing lid, stabilizing the blending ratio of the filler, and preventing defective dispersion due to fall and mixing of the filler after the completion of kneading, for promoting improvement of dispersion and uniformity of kneaded materials such as rubber, plastics, etc. as well as stability of quality.

To achieve this objective, the kneader of the first aspect of the present invention is a kneader comprising a mixing tank for storing the kneaded material, a pair of rotors disposed in parallel for kneading the kneaded material stored in the mixing tank, and a pressurizing lid inserted slidably in the opening at the top of the mixing tank, characterized in that the sliding portion of the pressurizing lid against the mixing tank is divided into a plurality of stages (upper, lower), a packing for reducing the clearance between the respective pressurizing lids and the side wall of the mixing tank as much as possible is disposed, and an air reservoir is formed between the upper and lower lids.

In this case, it is possible to form a discharge channel in the clearance between one side of the pressurizing lid at the top stage and the side wall of the mixing tank, to discharge the filler which is discharged via the air reservoir through the discharge channel, and to dispose a dust collecting duct at the top of the discharge channel.

Furthermore, to achieve the objective described above, the kneader of the second aspect of the present invention is a kneader comprising a mixing tank for storing the kneaded material, a pair of rotors disposed in parallel for kneading the kneaded material stored in the mixing tank, and a pressurizing lid inserted slidably in the opening at the top of the mixing tank, characterized in that the sliding portion of the pressurizing lid against the mixing tank is divided into a plurality of stages (upper, lower), a packing is disposed for reducing the clearance between the lower pressurizing lid and the side wall of the mixing tank, on the lower pressurizing lid as much as possible, and an air reservoir is formed between the upper and lower lids.

In this case, it is possible to realize the top side face and the bottom side face, which constitute the opposing face of the upper lid and the lower lid, as sloped faces opening toward the outside, and form the two sloped faces in a way to be continuous on a curved side face.

According to the first aspect of the present invention, in a kneader comprising a mixing tank for storing the kneaded material, a pair of rotors disposed in parallel for kneading the kneaded material stored in the mixing tank, and a pressurizing lid inserted slidably in the opening at the top of the mixing tank, the sliding portion of the pressurizing lid against the mixing tank is divided into a plurality of stages (upper, lower), a packing is disposed for reducing the clearance between the respective pressurizing lids and the side wall of the mixing tank as much as possible, and an air reservoir is formed between the upper and lower lids. This construction makes it possible to control the force of the powder gushing through the air reservoir and effectively prevent gushing to outside from the packing disposed in the pressurizing lid at the top stage, even in case the powder gushed out from the packing disposed on the pressurizing lid of the lower stage, thus enabling to eliminate the cleaning process in the kneading process, stabilize the blending ratio of the filler, and prevent defective dispersion of the filler due to fall and mixing after the completion of kneading, for promoting improvement of dispersion and uniformity of kneaded material as well as stability of quality.

In this case, by forming a discharge channel in the clearance between one side of the pressurizing lid at the top stage and the side wall of the mixing tank, to discharge the filler which is discharged via the air reservoir through said discharge channel, and disposing a dust collecting duct at the top of the discharge channel, it becomes possible to discharge, through the discharge channel, the filler which inevitably gushes to outside, and suck and recover the spouted filler by means of the dust collecting duct disposed on the pressurizing lid at the top stage, in the case of a kneading work with a large blending volume of powder making a large volume of filler gush out from the lower-stage pressurizing lid into the air reservoir.

According to the second aspect of the present invention, in a kneader comprising a mixing tank for storing the kneaded material, a pair of rotors disposed in parallel for kneading the kneaded material stored in the mixing tank, and a pressurizing lid inserted slidably in the opening at the top of the mixing tank, the sliding portion of the pressurizing lid against the mixing tank is divided into a plurality of stages (upper, lower), a packing is disposed for reducing the clearance between the lower pressurizing lid and the side wall of the mixing tank as much as possible, on the lower pressurizing lid, and an air reservoir is formed between the upper and lower lids. This construction makes it possible to control the force of the powder gushing through the air reservoir and effectively prevent gushing to outside through the clearance between the lid at the top stage and the side wall of the mixing tank, even in case the powder gushed out from the lid of the lower stage, thus enabling to eliminate the cleaning process in the kneading process, stabilize the blending ratio of the filler, and prevent defective dispersion of the filler due to fall and mixing after the completion of kneading, for promoting improvement of dispersion and uniformity of kneaded material as well as stability of quality.

In this case, by realizing the top side face and bottom side face, which constitute the opposing face of the upper lid and the lower lid, as sloped faces opening toward the outside, and forming said two sloped faces in a way to be continuous on a curved side face, it becomes possible to allow the current of the air containing the filler, which penetrated from the lower-stage lid, to draw an arc smoothly at the portion of curved face, thus providing a kneader capable of greatly reducing the amount of powder adhering and accumulating on the side face between the lids.

BRIEF DESCRIPTION OF THE DRAWINGS

FIG. 4 is a front elevation of a partial section showing other embodiment of the pressurizing lid packing of the kneader according to the first aspect of the invention, FIG. 4 (*a*) showing an embodiment in which the degree of sealing of the lower-stage lid is set lower than that of the upper-stage lid, and FIG. 4 (*b*) showing an embodiment in which the pressurizing lid packing is provided in 3 stages.

FIG. 5 (*a*) is a plan view showing other embodiment of the kneader of the first aspect of the invention, while FIG. 5 (*b*) is a front elevation of a partial section.

FIG. 9 is a front elevation of a partial section showing other embodiment of the pressurizing lid of the kneader according to the second aspect of the invention, FIG. 9 (*a*) showing an embodiment in which the packing is provided in the lower-stage lid only, and FIG. 9 (*b*) showing an embodiment in which the packing is provided at 2 points of lower stage and middle stage among the 3 stages.

DETAILED DESCRIPTION OF THE INVENTION

Exemplary embodiments of the kneader according to the present invention will be explained below, with reference to the drawings.

Figure 1:
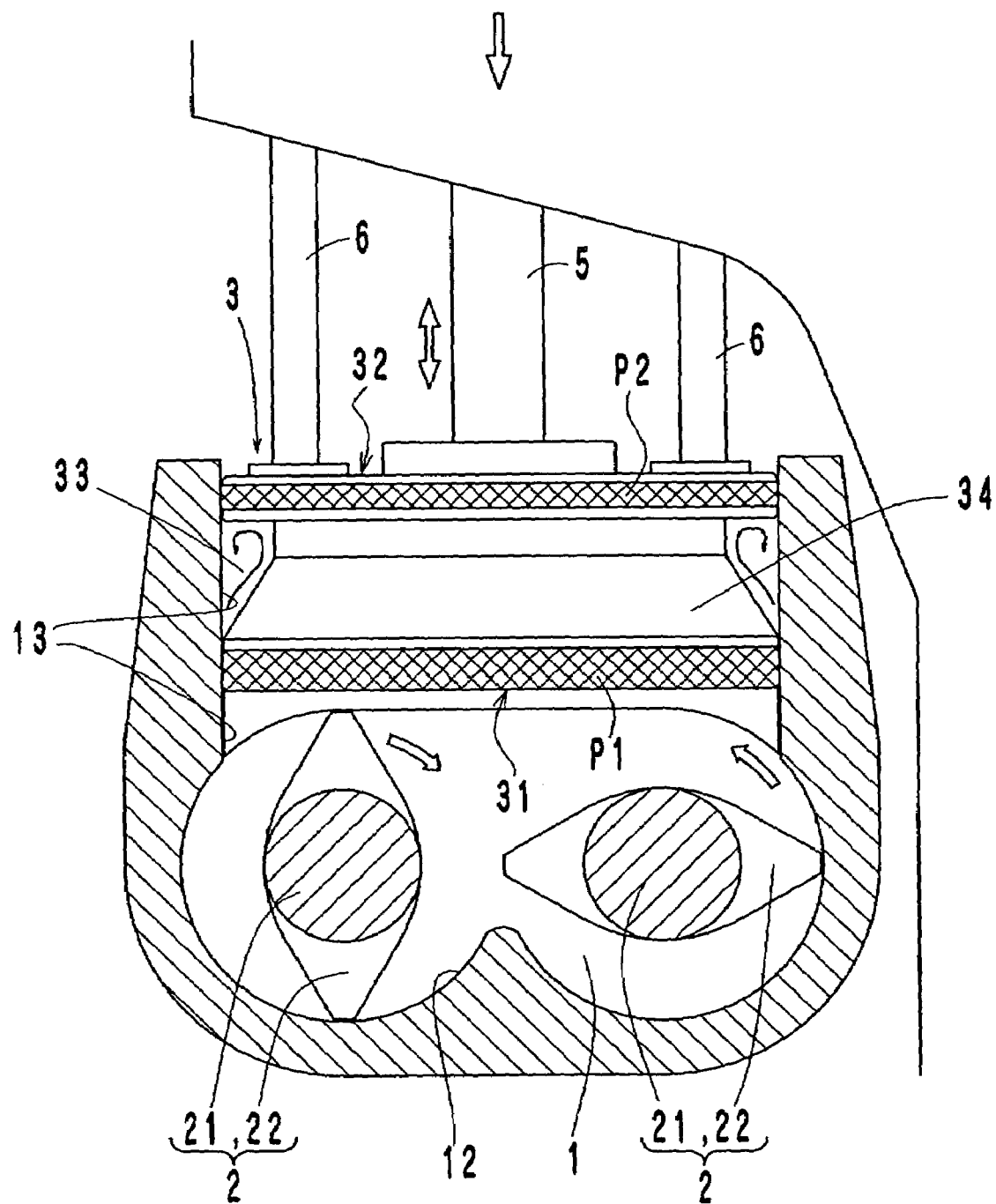
FIG. 1 is a front elevation of a partial section showing an embodiment of the kneader according to the first aspect of the invention.
Figure 2:
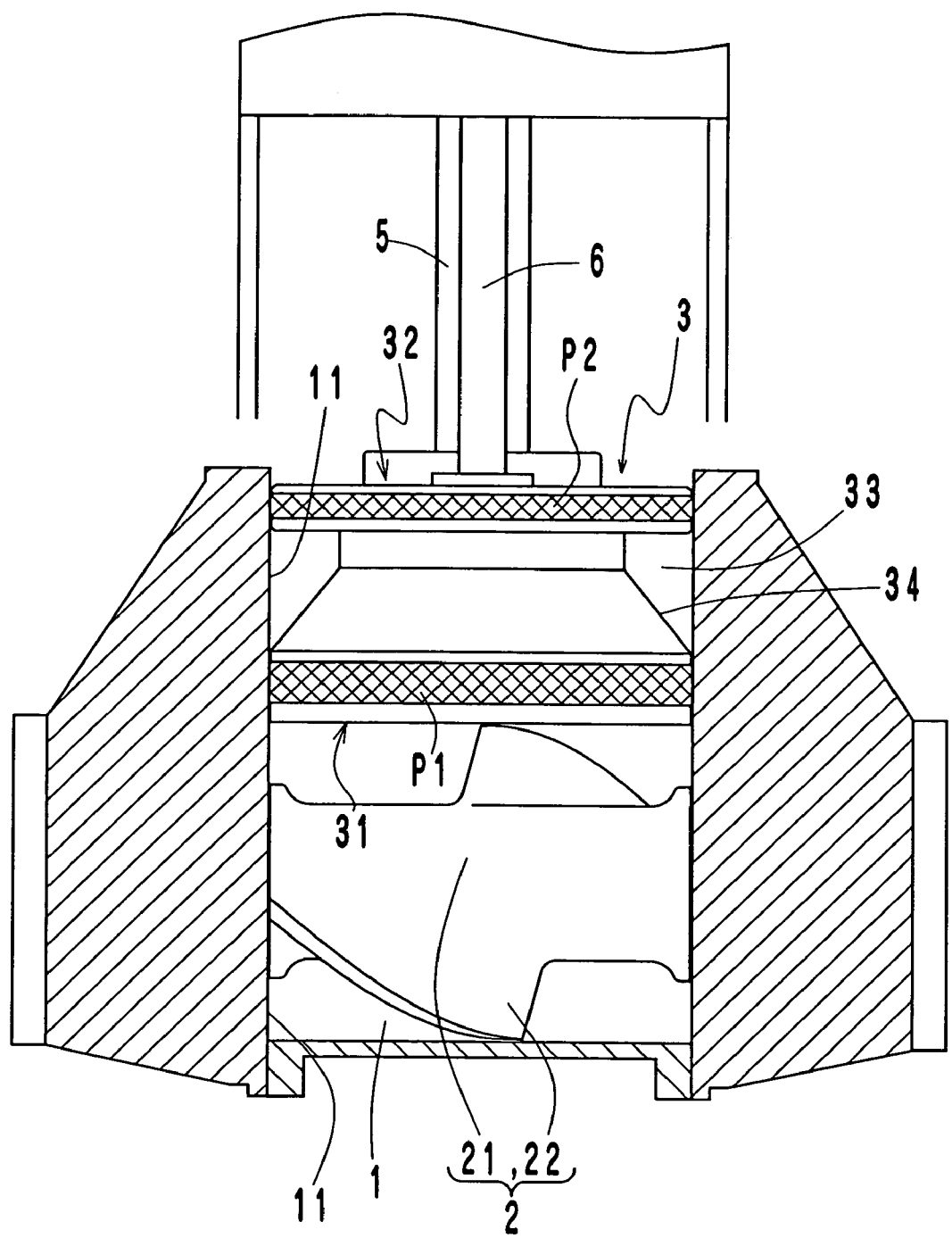
FIG. 2 is a side view of a partial section showing the kneader of the first aspect of the invention.
Figure 3:
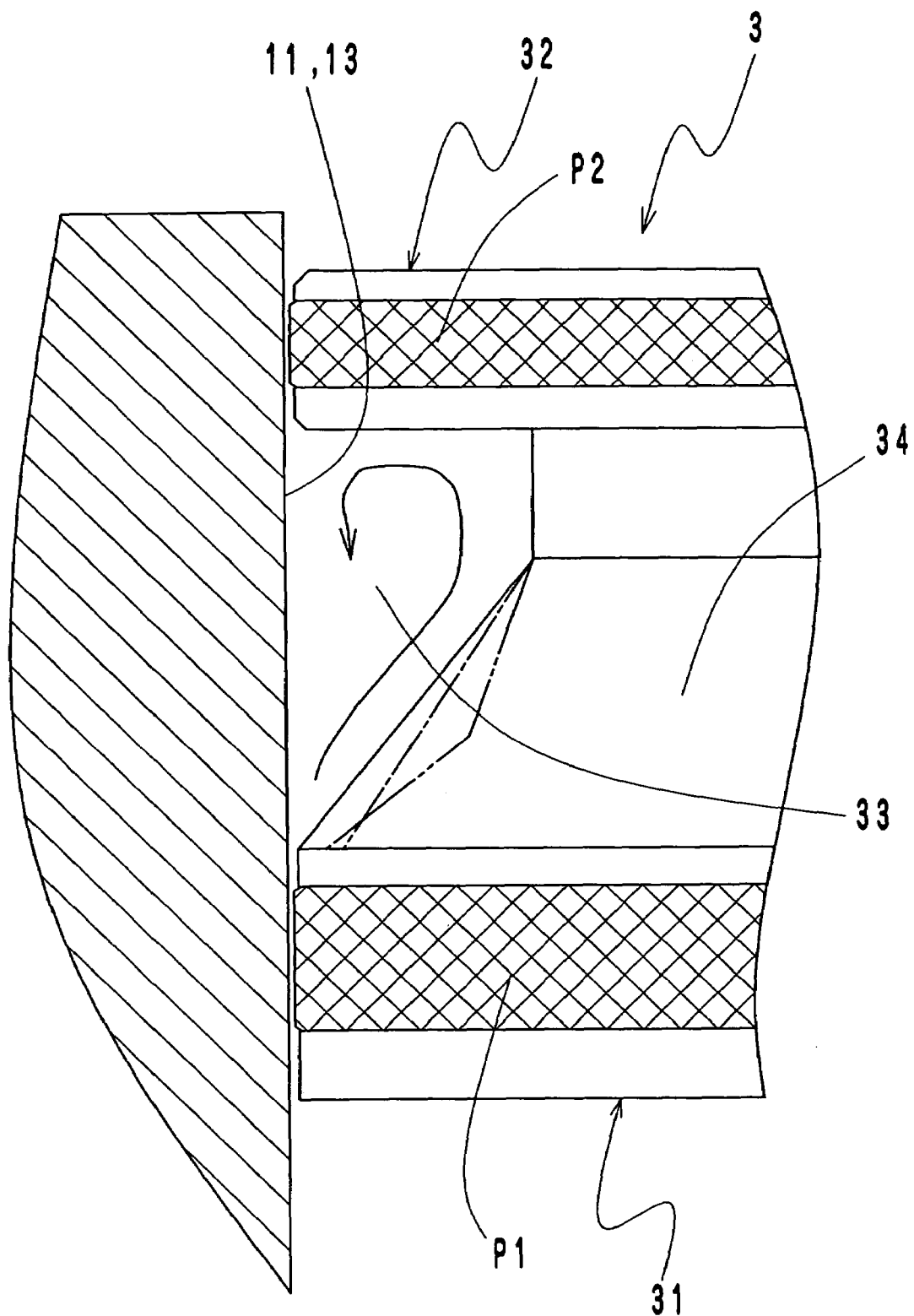
FIG. 3 is an expanded partial sectional view explaining the portion of air reservoir of the kneader of the first aspect of the invention.

FIG. 1 to FIG. 3 show an embodiment of the kneader according to the first aspect of the invention.

The kneader comprises a mixing tank 1 having a cocoon-shaped section for storing the kneaded material, a pair of rotors 2 disposed in parallel for kneading the kneaded material stored in the mixing tank 1, and a pressurizing lid 3 inserted slidably in the opening at the top of the mixing tank 1.

Between the side walls 11 opposing each other of the mixing tank 1 a circumferential wall 12 is disposed and is formed in the shape of a cocoon in a way to follow the outer periphery of the turning locus of the rotor blade 22, thus providing the mixing tank 1 with a cocoon-shaped section, and forming a chamber with the side wall 11 and the circumferential wall 12.

The circumferential wall 12 is formed in the shape of a cocoon in a way to surround, to be in detail, the portion serving as the bottom part and the portion serving as the side part, of the outer circumferential face of the rotor blade 22 of the two parallel rotors 2, but the top part of the circumferential wall 12 is left open, and a pressurizing lid 3 is disposed in this opening.

The rotors 2 have two rotor shafts 21 disposed in parallel through the side wall 11 of the mixing tank 1, and supported in a way to turn inward respectively, and a twisted rotor blade 22 is formed integrally on the respective rotor shafts 21 from one end of the rotor shaft 21 toward the other end up to about the center of the rotor shaft 21.

And, the pair of rotors 2 are designed to turn at one same speed or at different speeds by means of a drive unit (not illustrated), in the state in which the rotor blades 22 are mutually shifted in phase by 90 degrees or at an optional angle in the direction of rotation.

To prevent gushing of the filler through the clearance on four faces between the portion higher than the rotor 2 of the side wall 11 and the upper side wall 13 of the circumferential wall 12 of the mixing tank 1, the pressurizing lid 3 has a lower-stage lid 31 and an upper-stage lid 32, and at the sliding portion between the lower-stage lid 31 and the upper-stage lid 32 against the mixing tank 1 packings P1, P2 are disposed respectively for reducing said clearance as much as possible.

Between the lower-stage lid 31 and upper-stage lid 32 an air reservoir 33 is formed. This air reservoir 33 enables control the force of the filler gushing from the packing P1 disposed in the lower-stage lid 31 to effectively prevent gushing to outside with the packing P2 disposed in the upper-stage pressurizing lid 32. At that time, if the transfer portion to lower-stage lid 31 and upper-stage pressurizing lid 32 is constructed with a sloped face 34, and if the air reservoir 33 formed between the lower-stage lid 31 and the upper-stage pressurizing lid 32 is realized in an annular (donut) shape with a trapezoidal front section, as shown in the drawing, the filler which gushed out from the lower-stage lid 31 spreads along the sloped face 34, as shown in FIG. 3, and hits against the bottom face of the upper-stage pressurizing lid 32 and its force can thus be effectively controlled. Moreover, when the pressurizing lid 3 goes up, the filler which got into the air reservoir 33 is returned to the inside of the mixing tank 1 through the clearance between the lower-stage lid 31 and the side wall 11.

At that time, the air reservoir 33 may have a construction divided into a plurality of chambers with ribs, in addition to the annular shape given in the drawing, and, in that case, can improve the strength of the flange portion on which to mount the upper-stage pressurizing lid 32. Furthermore, the sloped face 34 makes an action of returning the filler into the mixing tank 1 when the pressurizing lid 3 moves up and down, even if it is of a type having a bottom part brought close to the side wall 11 side as shown with a single-dot chain line and a double-dot chain line.

Still more, a piston rod 5 and a guide rod 6 of an air cylinder are provided on the pressuring lid 3, to adjust the inside of the mixing tank 1 to have a shape and inner volume suitable to the kneaded material, by supporting the mixing tank 1 in a way to be movable up and down, thus ensuring effective biting of the kneaded material between the rotors 2.

In this way, the kneader of this embodiment is a kneader comprising a mixing tank 1 with a cocoon-shaped section for storing the kneaded material, a pair of rotors 2 disposed in parallel for kneading the kneaded material stored in the mixing tank 1, and a pressurizing lid 3 inserted slidably in the opening at the top of the mixing tank 1, wherein an air reservoir 33 formed with the lower-stage lid 31 and the upper-stage pressurizing lid 32 provided in the pressurizing lid 3 enables the prevention of gushing of the filler to outside through the clearance between the mixing tank 1 and the pressurizing lid 3, to thereby eliminate the cleaning process in the kneading process, stabilize the blending ratio of the filler, prevent defective dispersion due to fall and mixing of filler after the completion of kneading, and promote improvement of dispersion and uniformity of the kneaded material as well as stability of quality.

FIG. 4 shows another embodiment of the pressurizing lid of the kneader according to the first aspect of the invention.

The pressurizing lid indicated in FIG. 4 (a) shows an example in which the degree of sealing of the packing P1 disposed in the lower-stage lid 31 is set lower than that of the packing P2 disposed in the upper-stage lid 32.

To be concrete, this can be achieved, as shown in the drawing, by setting the width of the packing P1 to be narrower than the packing P2, and setting the clearance between the packing P1 and the side wall 11 and/or the upper side wall 13 to be larger than the clearance between the packing P2 and the side wall 11 and/or the upper side wall 13.

This makes it possible to reduce fluctuations of the internal pressure in the mixing tank 1 due to up-down movements of the pressurizing lid 3.

The pressurizing lid 3 of the kneader indicated in FIG. 4 (b) is constructed in a form split into 3 stages or lower-stage lid 31, middle-stage lid 32A, and upper-stage lid 32B, by disposing packings P1, P2A, P2B in them respectively, to effectively prevent gushing of the filler to outside the pressurizing lid 3 from the mixing tank 1.

FIG. 5 shows another embodiment of the kneader according to the first aspect of the invention.

This kneader is an improved type of the kneader in the first embodiment, having a particularly high dose of the powder in the kneading, applied in the case where there is a fear of gushing of the filler from the packing P2 disposed in the upper-stage lid 32, even with the structure of embodiment 1.

This kneader adopts a structure in which the packing P2 in the upper-stage lid 32 is removed only on one face out of four faces. This enables the widening of the clearance produced between the portion above the rotor 2 of the side wall 11 and the upper side wall 13 of the circumferential wall 12 of the mixing tank 1, only on one face where the packing P2 has been removed, to form the clearance 32a.

Over the clearance 32a, a duct 8 is disposed for sucking the gushing filler by means of a suction fan (not illustrated).

In this way, the kneader of this embodiment prevents gushing of the filler to outside through the clearance other than the clearance 32a between the mixing tank 1 and the pressurizing lid 3, by means of an air reservoir 33 formed with the lower-stage lid 31 and the upper-stage pressurizing lid 32 disposed in the pressurizing lid 3 in the same way as in embodiment 1, but the filler gushes to outside only through the clearance 32a between the mixing tank 1 and the pressurizing lid 3, in the case where the dose of the powder in the kneaded material is particularly high. However, since the filler which gushed out can be effectively sucked by the duct 8 disposed over the clearance 32a, it becomes possible to eliminate the cleaning process in the kneading process, prevent defective dispersion of the filler due to fall and mixing after the completion of kneading, and promote improvement of dispersion and uniformity of kneaded materials as well as stability of quality.

Figure 6:
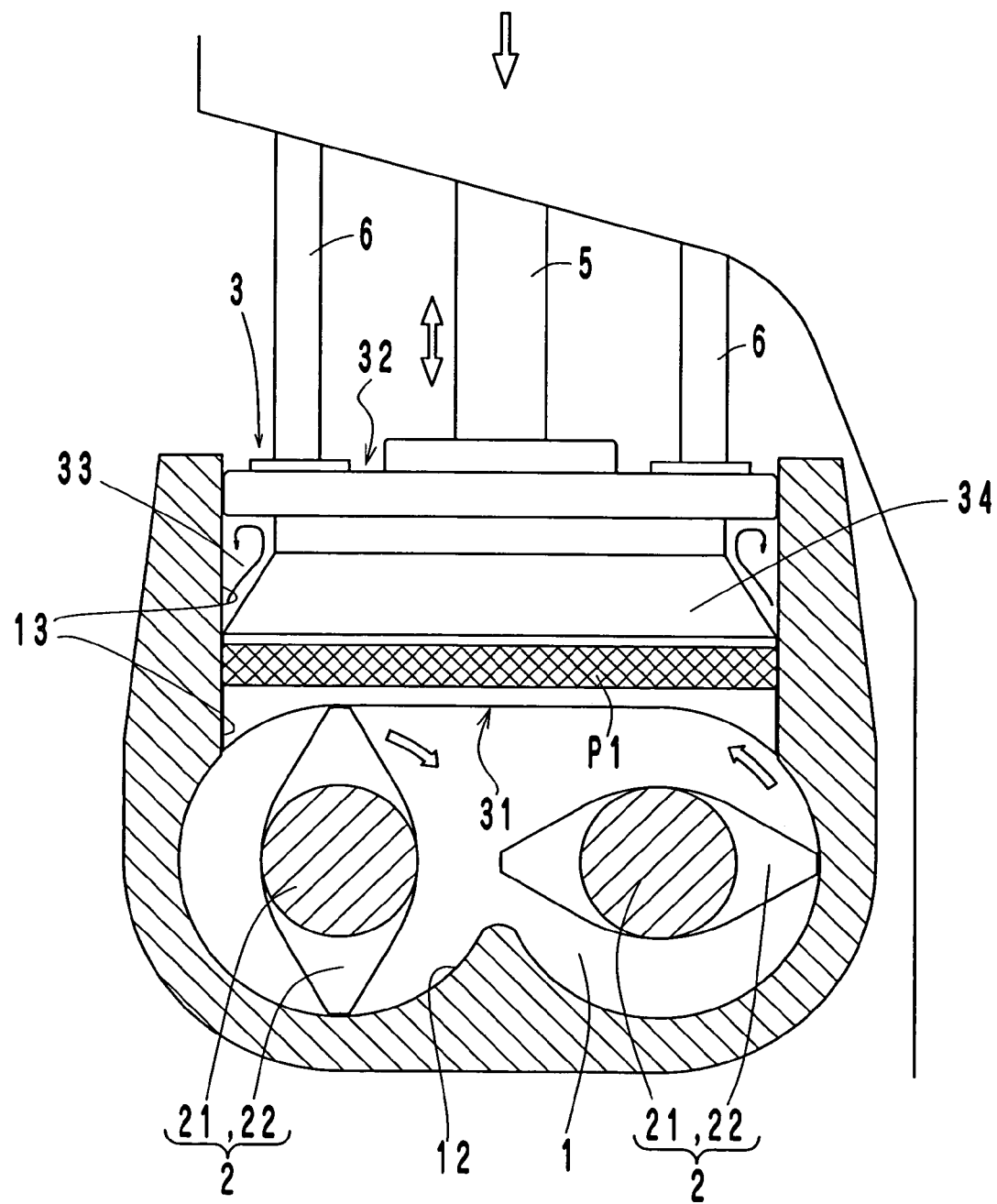
FIG. 6 is a front elevation of a partial section showing an embodiment of the kneader according to the second aspect of the invention.
Figure 7:
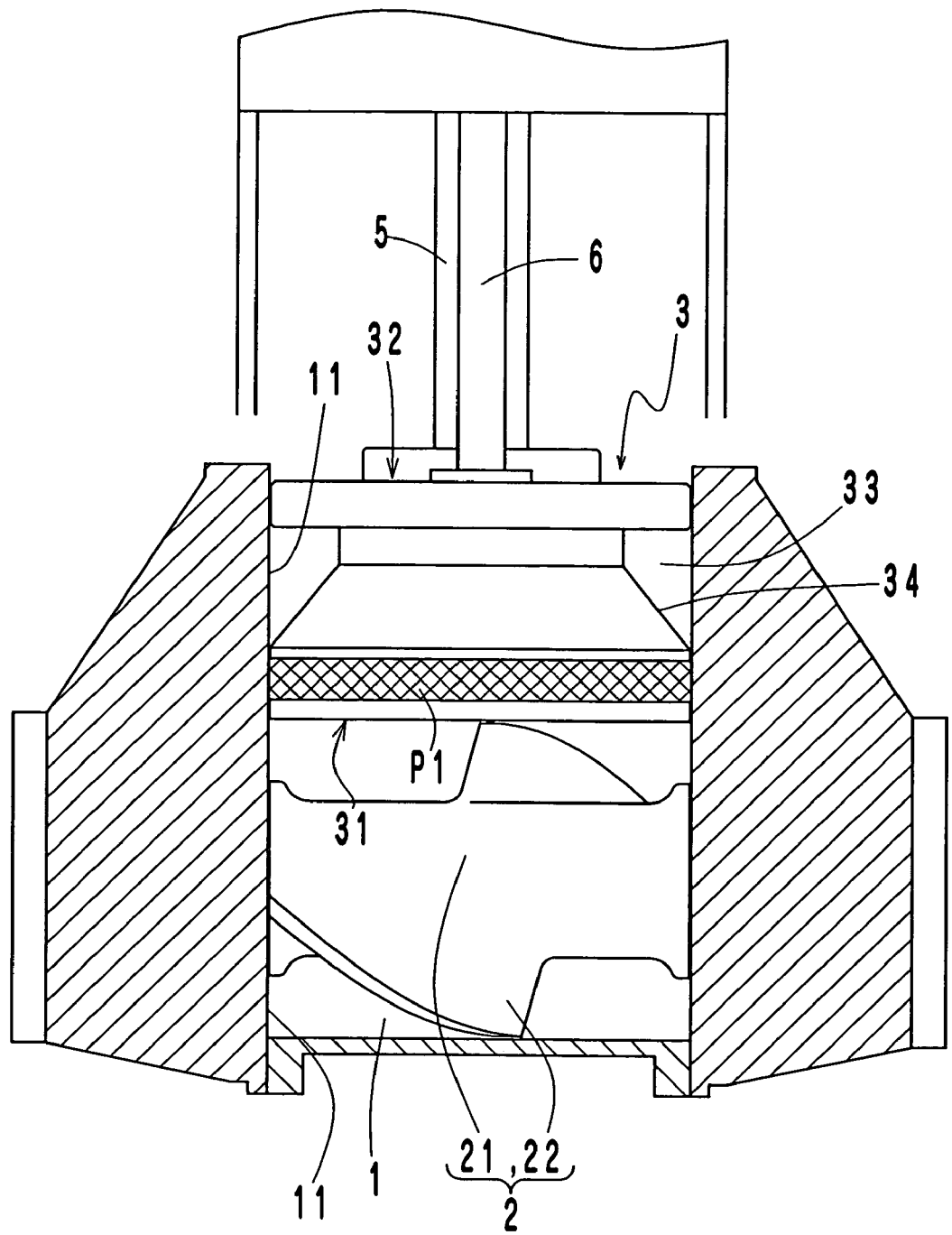
FIG. 7 is a side view of a partial section showing the kneader of the second aspect of the invention.
Figure 8:
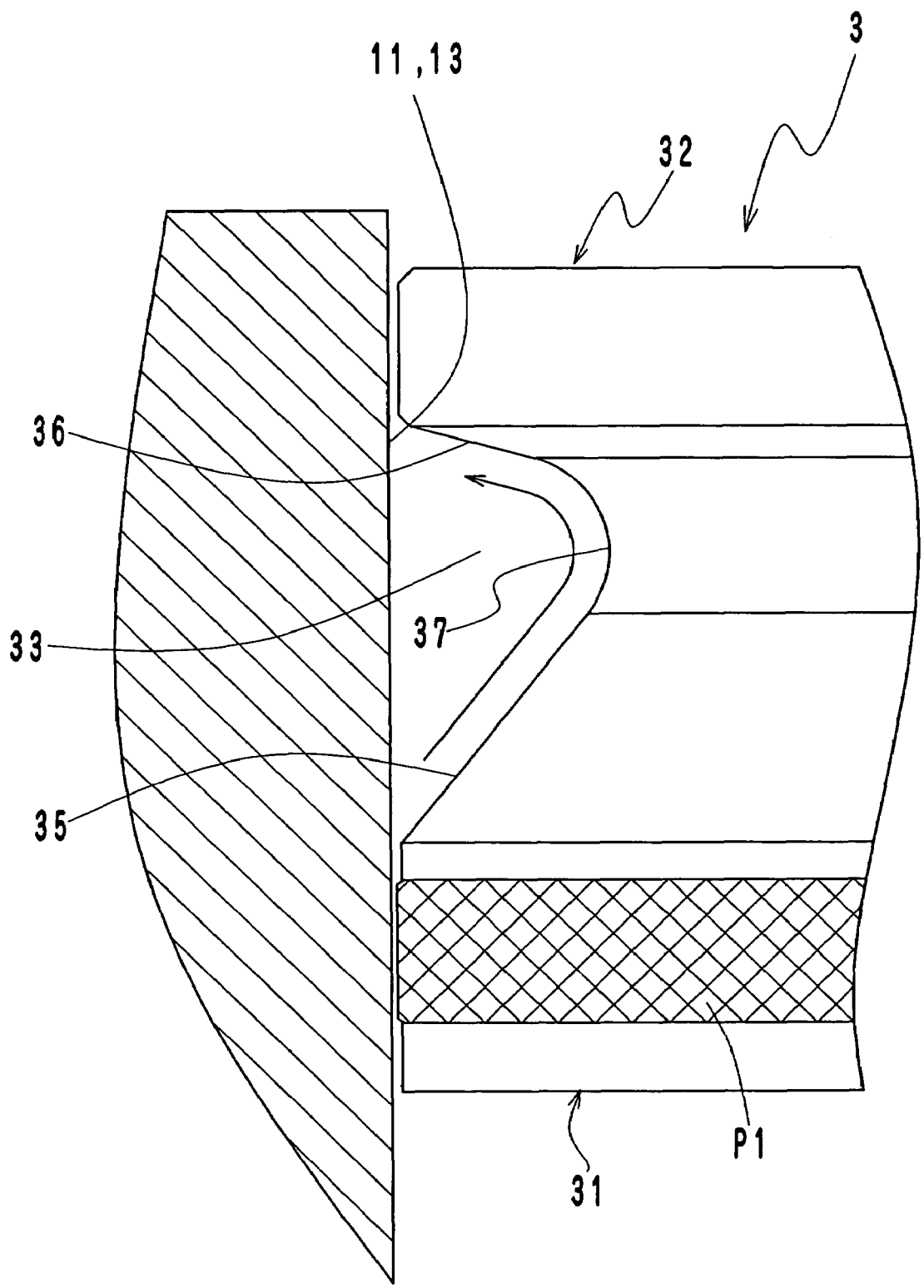
FIG. 8 is an expanded partial sectional view explaining the portion of air reservoir of the kneader of the second aspect of the invention.

FIG. 6 to FIG. 8 indicate an embodiment of the kneader according to the second aspect of the invention.

The kneader of the second aspect of the invention has a construction equal to that of the kneader according to the first aspect of the invention, except that the structure of the pressurizing lid 3 is different from that of the kneader of the first aspect of the invention, and an explanation of the construction will be omitted.

In addition, on this pressurizing lid 3 a lower-stage lid 31 and an upper-stage lid 32 are disposed at the top and the bottom, to prevent gushing of the filler through the clearance on four faces between the portion higher than the rotor 2 of the side wall 11 and the upper side wall 13 of the circumferential wall 12 of the mixing tank 1, and, unlike the kneader of the first aspect of the invention, a packing P1 is disposed only at the sliding portion of the lower-stage lid 31 against the mixing tank 1. The clearance between the upper-stage lid 32 and the side walls 11, 13 of the mixing tank 1 shall preferably be of 3 mm or so.

Further, an air reservoir 33 is formed in an annular shape between the lower-stage lid 31 and upper-stage lid 32. This air reservoir 33 enables control of the force of the filler gushing from the lower-stage lid 31 and check gushing to outside with upper-stage lid 32. At that time, in the case where the top side face of the lower-stage lid 31 is constructed with a sloped face 34 and the air reservoir 33 formed between the lower-stage lid 31 and the upper-stage lid 32 is realized in an annular (donut) shape with a trapezoidal front section, as shown in the drawing, the filler which gushed out from the lower-stage lid 31 spreads along the sloped face 34, and hits against the bottom face of the upper-stage pressurizing lid 32 and its force can thus be effectively controlled. Moreover, when the pressurizing lid 3 goes up, the filler which got into the air reservoir 33 is returned to the inside of the mixing tank 1 through the clearance between the lower-stage lid 31 and the side wall 11.

Furthermore, the top face of the lower-stage lid 31 and the bottom side face of the upper-stage pressurizing lid 32 may be formed as a sloped face 35 and a sloped face 36 opening toward the outside respectively, so that said two sloped faces 35, 36 may be continuous on a curved side face 37. This makes it possible for the current of the air containing the filler, which penetrated from the lower-stage lid 31, to draw an arc smoothly along the sloped faces 35, 36 and the curved face as shown in FIG. 8, greatly reducing the amount of powder adhering and accumulating between the lids. Still more, by making the sloped 36 look downward from above, it becomes possible to check for adhesion of the filler to the point concerned and clean it accurately and easily without looking into that point when cleaning the bottom face of the upper-stage pressurizing lid 32.

At that time, the air reservoir 33 may have a construction divided into a plurality of chambers with ribs, in addition to the annular shape given in the drawing, and, in that case, can improve the strength of the flange portion on which to mount the upper-stage pressurizing lid 32.

In this way, the kneader of this embodiment is, like the kneader of the first aspect of the invention, a kneader comprising a mixing tank 1 with a cocoon-shaped section for storing the kneaded material, a pair of rotors 2 disposed in parallel for kneading the kneaded material stored in the mixing tank 1, and a pressurizing lid 3 inserted slidably in the opening at the top of the mixing tank 1, wherein an air reservoir 33 formed with the lower-stage lid 31 and the upper-stage pressurizing lid 32 provided in the pressurizing lid 3 enables to prevent gushing of the filler to outside through the clearance between the mixing tank 1 and the pressurizing lid 3, to thereby eliminate the cleaning process in the kneading process, stabilize the blending ratio of the filler, and prevent defective dispersion due to fall and mixing of the filler after the completion of kneading, and promote improvement of dispersion and uniformity of the kneaded material as well as stability of quality.

FIG. 9 shows another embodiment of the pressurizing lid of the kneader according to the second aspect of the invention.

The pressurizing lid 3 indicated in FIG. 9 (a), constructed in 3 stages or lower-stage lid 31, middle-stage lid 32A and upper-stage lid 32B, effectively prevents gushing of the filler to outside the pressurizing lid 3 from the mixing tank 1. In this case, it may be all right to dispose a packing P1 only in the lower-stage lid 31, as shown in FIG. 9 (a), or also dispose a packing P2 in the middle-stage pressurizing lid 32A as well, as shown in FIG. 9 (b).

Figure 10:
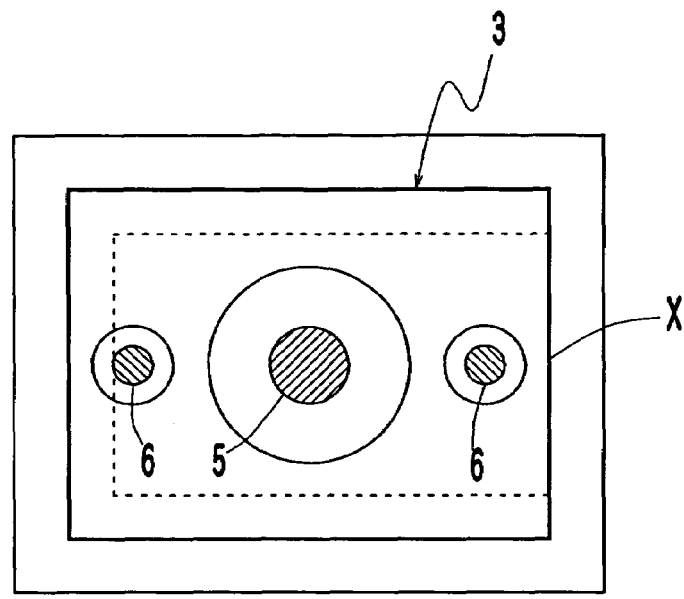
FIG. 10 (*a*) is a plan view showing other embodiment of the kneader of the second aspect of the invention, while FIG. 10 (*b*) is a front elevation of a partial section.
Figure 10:
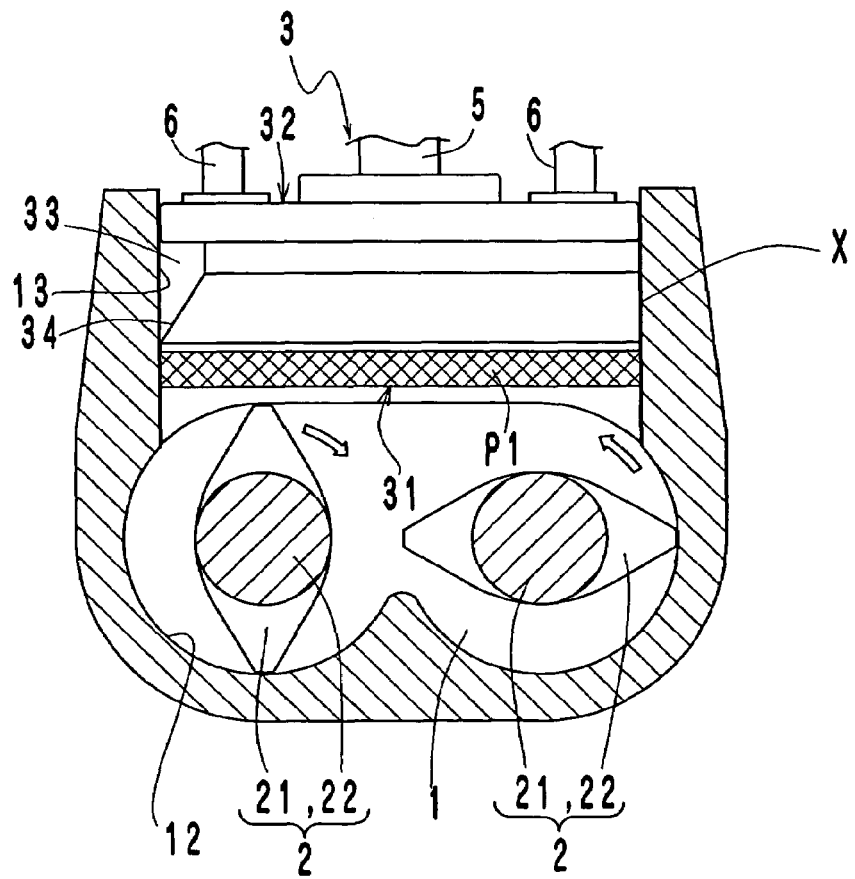
Figure 11:
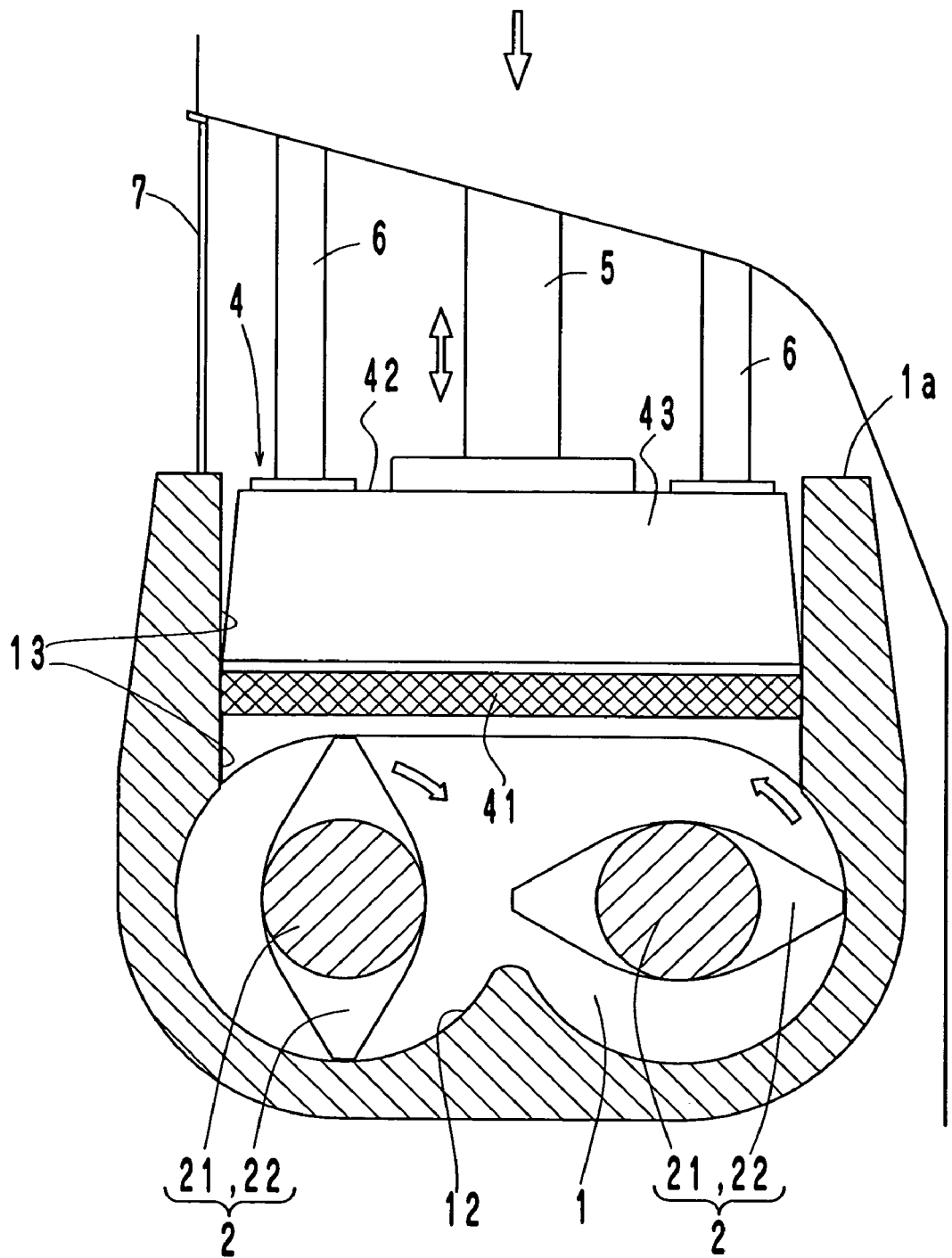
FIG. 11 is a front elevation of a partial section showing a conventional kneader.

FIG. 10 indicates another embodiment of the kneader according to the second aspect of the invention.

This kneader is an improved type of the kneader in the first embodiment, and shows an example in which the air reservoir 33 is constructed in the shape of U, without constructing the air reservoir 33 on the side X where the cleaning is difficult because no sufficient cleaning space for the pressurizing lid can be secured, from the viewpoint of kneader structure.

Similarly, in the case where two sides of the pressurizing lid 3 are difficult to clean, it may be all right to construct the air reservoir 33 in the shape of L only on two sides available for cleaning, without constructing the air reservoir 33 on the sides difficult to clean.

However, because the air reservoir 33 can effectively prevent gushing of the filler to outside when it is provided in an annular shape, the air reservoir 33 shall preferably be provided on all of the 4 sides as much as possible, in an annular shape (donut shape).

So far, an explanation has been given of the kneader of the present invention, based on its embodiments, but the present invention is not restricted to the constructions described in the above-mentioned embodiments, and its construction can be altered as required within the extent not deviating from its main purpose.

The kneader of the present invention, having the characteristics of eliminating the cleaning process in the kneading process by preventing gushing of the filler through the clearance between the mixing tank and the pressurizing lid, stabilizing the blending ratio of the filler, and preventing defective dispersion due to fall and mixing of filler after the completion of kneading, for promoting improvement of dispersion and uniformity of kneaded materials as well as stability of quality, can be used suitably for the purpose of kneading of materials precisely containing various kinds of filler.

The invention claimed is:

1. A kneader comprising:
  a mixing tank for storing kneaded material;
  a pair of rotors disposed in parallel for kneading the kneaded material stored in the mixing tank; and
  a pressurizing lid inserted slidably in an opening at a top of the mixing tank such that a clearance is maintained between the pressurizing lid and a side wall of the mixing tank, wherein a sliding portion of the pressurizing lid against the mixing tank is divided into a plurality of stages of lids including an upper stage lid and a lower stage lid, packings are disposed for reducing the clearance between the upper stage and lower stage lids and the side wall of the mixing tank as much as possible, and wherein an air reservoir is formed between said upper stage and lower stage lids.

2. A kneader as defined in claim 1, further comprising:
  a discharge channel formed in the clearance between a side of the pressurizing lid at the upper stage lid and the side wall of the mixing tank, the discharge channel being arranged to discharge filler which is discharged via the air reservoir through said discharge channel; and
  a dust collecting duct arranged at a top of the discharge channel.

3. A kneader comprising:
  a mixing tank for storing kneaded material;
  a pair of rotors disposed in parallel for kneading the kneaded material stored in the mixing tank; and
  a pressurizing lid inserted slidably in an opening at a top of the mixing tank such that a clearance is maintained between the pressurizing lid and a side wall of the mixing tank, wherein a sliding portion of the pressurizing lid against the mixing tank is divided into a plurality of stages of lids including an upper stage lid and a lower stage lid, a packing is disposed on the lower stage lid for reducing the clearance between the lower stage lid and the side wall of the mixing tank as much as possible, and wherein an air reservoir is formed to include an annular groove in the pressurizing lid between said upper stage and lower stage lids.

4. A kneader as defined in claim 1, wherein the pressurizing lid includes two sloped surfaces extending from a top side of the lower stage lid and a bottom side of the upper stage lid, respectively, the sloped surfaces opening outwardly, and a curved surface extending between said two sloped surfaces so as to be continuous with said two sloped surfaces.

5. A kneader as defined in claim 2, wherein the pressurizing lid includes two sloped surfaces extending from a top side of the lower stage lid and a bottom side of the upper stage lid, respectively, the sloped surfaces opening outwardly, and a curved surface extending between said two sloped surfaces so as to be continuous with said two sloped surfaces.

6. A kneader as defined in claim 3, wherein the pressurizing lid includes two sloped surfaces extending from a top side of the lower stage lid and a bottom side of the upper stage lid, respectively, the sloped surfaces opening outwardly, and a curved surface extending between said two sloped surfaces so as to be continuous with said two sloped surfaces.

* * * * *